United States Patent
Runyan et al.

(10) Patent No.: US 11,995,853 B2
(45) Date of Patent: May 28, 2024

(54) SYSTEM AND METHOD FOR TRANSPARENT AUGMENTED REALITY

(71) Applicant: Honeywell Federal Manufacturing & Technologies, LLC, Kansas City, MO (US)

(72) Inventors: Paul Ryan Runyan, Prairie Village, KS (US); Eric Eugene Cornwell, Lees Summit, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 342 days.

(21) Appl. No.: 17/518,890

(22) Filed: Nov. 4, 2021

(65) Prior Publication Data

US 2023/0133440 A1 May 4, 2023

(51) Int. Cl.
| | | |
|---|---|---|
| *G02B 27/01* | (2006.01) | |
| *G06T 7/536* | (2017.01) | |
| *G06T 7/557* | (2017.01) | |
| *G06T 19/00* | (2011.01) | |

(52) U.S. Cl.
CPC .......... *G06T 7/536* (2017.01); *G02B 27/0179* (2013.01); *G06T 7/557* (2017.01); *G06T 19/006* (2013.01); *G02B 2027/0181* (2013.01)

(58) Field of Classification Search
CPC ..... G06T 7/536; G06T 7/557; G02B 27/0179; G02B 2027/0181; G02B 2027/0138; G02B 2027/014; G02B 2027/0178; G02B 2027/0187; G02B 27/017; G02B 27/0093
See application file for complete search history.

(56) References Cited

U.S. PATENT DOCUMENTS

| | | |
|---|---|---|
| 9,088,791 B2 | 7/2015 | Gross |
| 9,401,049 B2 | 7/2016 | Kim et al. |
| 9,503,681 B1 | 11/2016 | Popescu et al. |
| 9,759,916 B2 | 9/2017 | Beckman |
| 9,910,518 B2 | 3/2018 | Bliss |
| 9,972,130 B2 | 5/2018 | Cho et al. |
| 10,786,327 B2 * | 9/2020 | Anderson ............. G06T 19/006 |

(Continued)

*Primary Examiner* — Twyler L Haskins
*Assistant Examiner* — Angel L Garces-Rivera
(74) *Attorney, Agent, or Firm* — HOVEY WILLIAMS LLP

(57) ABSTRACT

A system and method for displaying augmented reality information for a real object. A transparent display displays the information for the real object within a field of view, such that the information and the real object are simultaneously viewable by a user. Data-gathering peripheral devices gather data of the field of view, including a camera gathering visual data for tracking the real object. An articulating arm moveably supports and facilitates repositioning the display and redirecting the data-gathering peripheral devices in a particular direction. A security interlock disables the data-gathering peripherals when the articulating arm is moved beyond a pre-established threshold, thereby preventing the data-gathering peripherals from gathering data of a real environment outside of a limit of the field of view as determined by the pre-established threshold. The security interlock may include an adjustable contact switch which adjustably defines the pre-established threshold in at least one direction.

20 Claims, 4 Drawing Sheets

(56) References Cited

U.S. PATENT DOCUMENTS

| | | |
|---|---|---|
| 2012/0058774 A1 | 3/2012 | Kim |
| 2016/0062121 A1* | 3/2016 | Border ............... G02B 27/0176 359/630 |
| 2016/0257252 A1 | 9/2016 | Zaitsev et al. |
| 2017/0280124 A1 | 9/2017 | Ahlborn et al. |
| 2019/0117318 A1* | 4/2019 | Charron ............... A61B 5/0077 |
| 2019/0175285 A1* | 6/2019 | Siemionow .......... A61B 5/7267 |

* cited by examiner

SYSTEM AND METHOD FOR TRANSPARENT AUGMENTED REALITY

STATEMENT REGARDING FEDERALLY-SPONSORED RESEARCH OR DEVELOPMENT

This invention was made with Government support under Contract No. DE-NA-0002839 awarded by the United States Department of Energy/National Nuclear Security Administration. The Government has certain rights in the invention.

FIELD

The present invention relates to systems and methods for implementing augmented reality, and more particularly, embodiments concern a system and method for implementing transparent augmented reality in which content is displayed on a transparent screen so as to overlay a real object behind the screen, including a security interlock which disables one or more data-gathering peripherals when physically directed outside of pre-established limits on the field of view.

BACKGROUND

Augmented reality relies on gathering data of real objects for which augmented information is presented in an augmented reality environment. This data may be used, for example, to determine the identity, current state, and orientation of and distance to the objects, which is then used to manage the presentation of the augmented reality regarding and with relation to the objects. However, augmented reality systems may be used in or near sensitive environments of which it may be undesirable to capture data. This background discussion is intended to provide information related to the present invention which is not necessarily prior art.

SUMMARY

Embodiments overcome the above-described and other problems and limitations in the prior art by providing a system and method for implementing transparent augmented reality in which content is displayed on a transparent screen so as to overlay a real object behind the screen, including a security interlock which disables one or more data-gathering peripherals when physically directed outside of pre-established limits on the field of view. Thus, embodiments advantageously protect confidential or otherwise sensitive or restricted information by providing a security interlock which prohibits the gathering of data regarding real objects outside of pre-established limits on the field of view (e.g., on an adjacent workbench).

In an embodiment of the present invention, a system for implementing transparent augmented reality may include a transparent display, one or more peripheral devices including a head tracker and one or more light sources, one or more data-gathering peripherals including a distance sensor and one or more cameras, an articulating arm, and a security interlock. The transparent display may display augmented reality information for a real object within a field of view, such that the augmented reality information and the real object are simultaneously viewable by a user. The head tracker may determine an orientation of a head of the user, and the one or more light sources may illuminate the field of view. The one or more data-gathering peripheral devices may gather data of the field of view. The distance sensor may measure a distance between the distance sensor and the real object, and the one or more cameras may gather visual data for tracking the real object. The articulating arm may moveably support and facilitate repositioning the transparent display and redirecting the one or more data-gathering peripherals in a particular direction. The security interlock may disable the data-gathering peripherals when the articulating arm is moved beyond a pre-established threshold, thereby preventing the data-gathering peripherals from gathering data of a real environment outside of a limit of the field of view as determined by the pre-established threshold.

In another embodiment of the present invention, a method for implementing transparent augmented reality may include the following steps. Augmented reality information for a real object within a field of view may be displayed on a transparent display, such that the augmented reality information and the real object are simultaneously viewable by a user. An orientation of a head of the user may be determined with a head tracker, and the field of view may be illuminated with one or more light sources. Data of the field of view may be gathered with one or more data-gathering peripheral devices including measuring with a distance sensor a distance between the distance sensor and the real object and gathering with one or more cameras visual data for tracking the real object. The transparent display may be moveably supported and repositionable and the one or more data-gathering peripherals may be moveably supported and redirectable in a particular direction with an articulating arm. The data-gathering peripherals may be disabled with a security interlock when the articulating arm is moved beyond a pre-established threshold, thereby preventing the data-gathering peripherals from gathering data of a real environment outside of a limit of the field of view as determined by the pre-established threshold.

Various implementations of the above-described embodiments may include any one or more of the following features. The head tracker may include one or more infrared sensors, the one or more cameras may include a red-green-blue camera, and/or one or more light sources may include a light emitting diode barlight. The transparent display may include a transparent panel including a touch screen input device facilitating the user entering an input by touching a surface of the transparent panel. The augmenting information may be a virtual object, a graph, a text, and/or an image. The security interlock may disable the one or more data-gathering peripherals by disconnecting power to them. The security interlock may include a contact switch which defines the pre-established threshold in at least one direction, wherein a position of the contact switch is adjustable to change a location of the pre-established threshold in the at least one direction. The security interlock may include first and second contact switches which define first and second pre-established thresholds on a horizontal axis, and third and fourth contact switches which define third and fourth pre-established thresholds on a vertical axis.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 1:
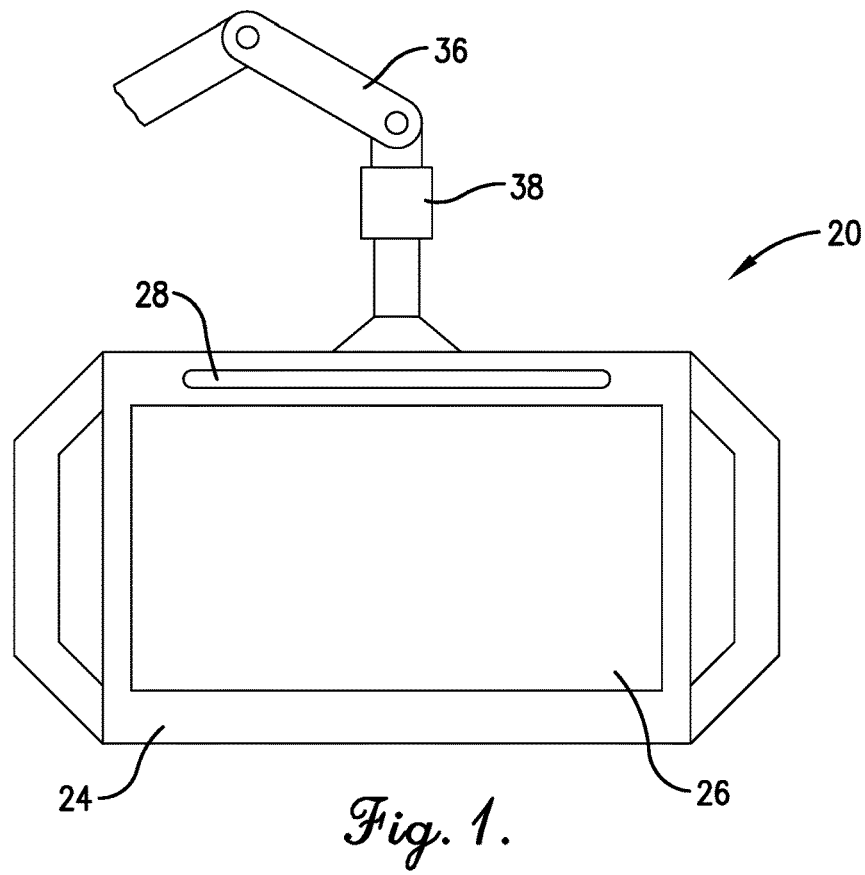
FIG. 1 is a user-side elevation view of an embodiment of a system for implementing transparent augmented reality.
Figure 4:
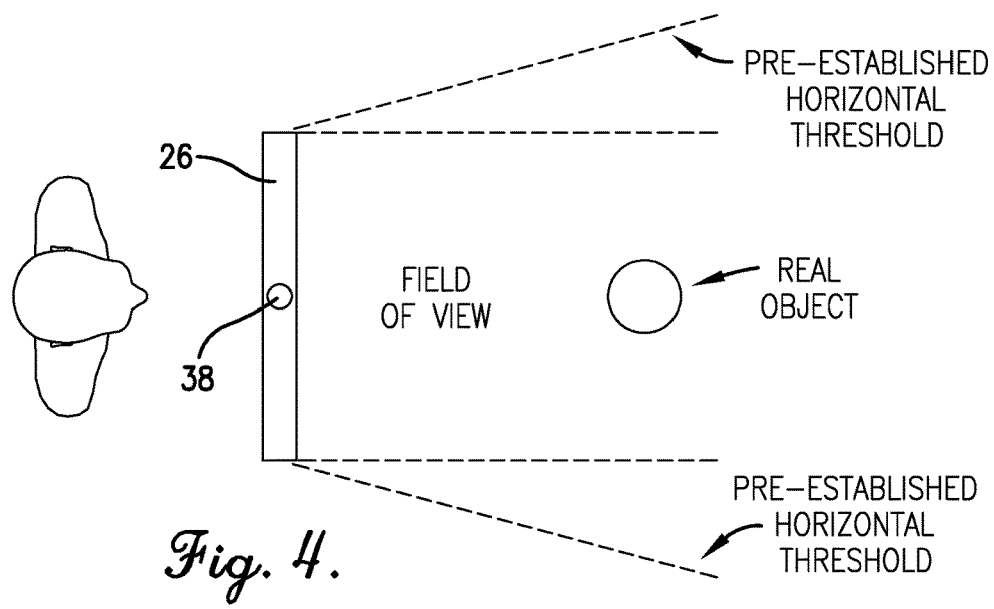
FIG. 4 is a plan view of the system of FIG. 1 showing horizontal pre-established thresholds limiting a field of view of data-gathering peripheral components of the system of FIG. 1.
Figure 6:
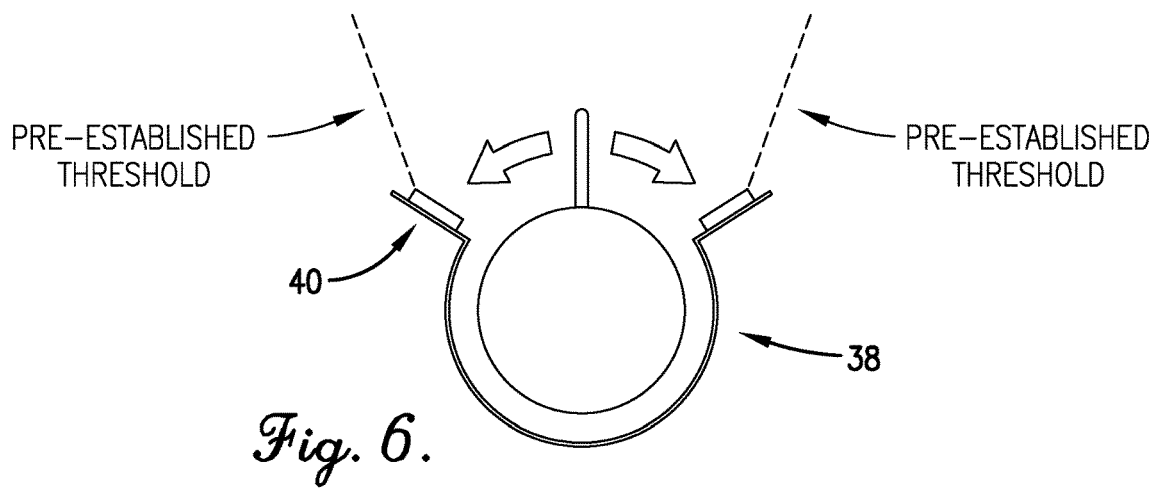
Figure 7:
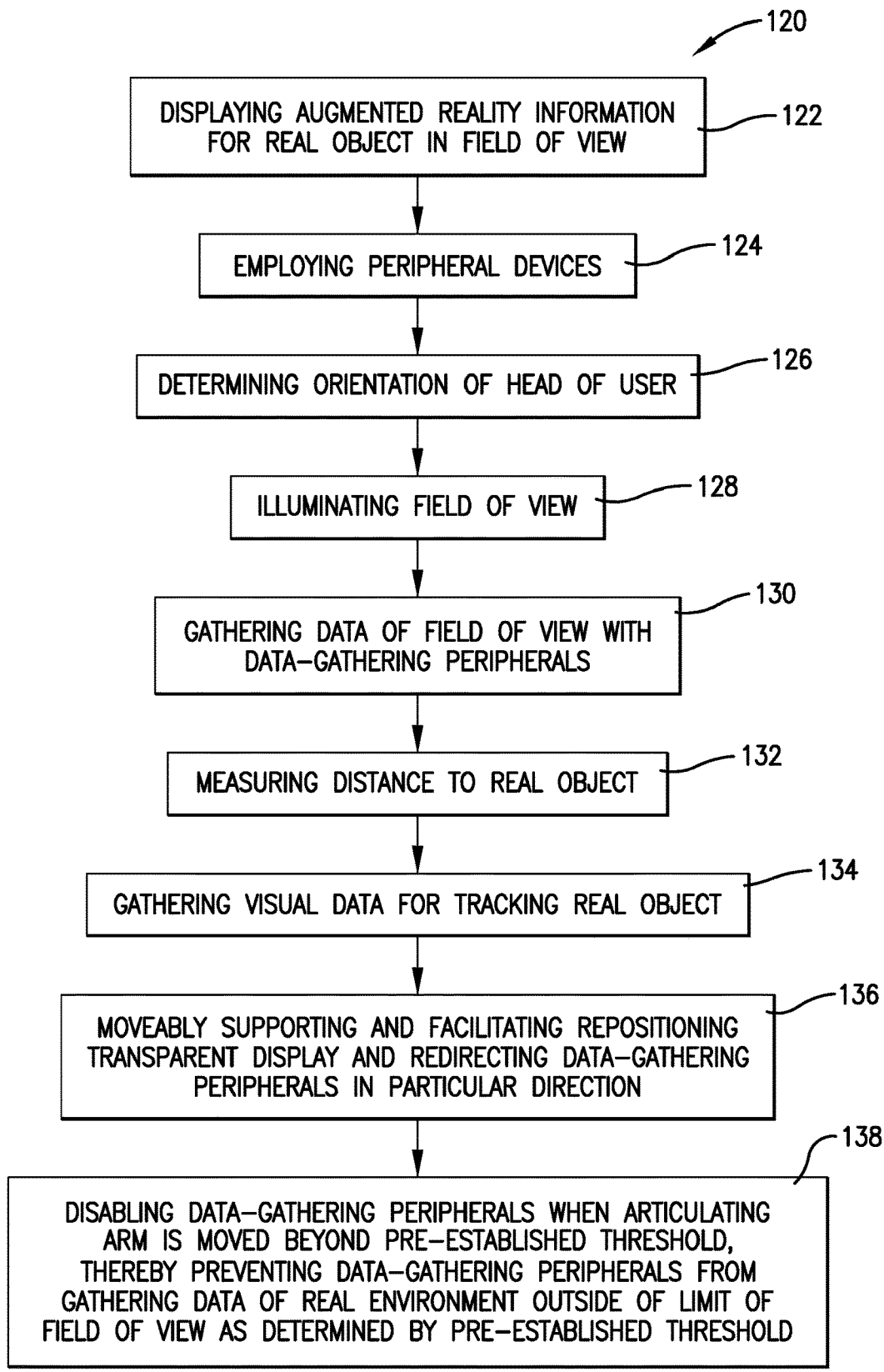

FIG. 6 is a cross-sectional plan depiction of an implementation of a security interlock component of the system of FIG. 1 which may be used to define and enforce the pre-established thresholds of FIG. 4 and/or 5; and FIG. 7 is a flowchart of steps in a method for implementing transparent augmented reality, wherein the method may reflect operation of and be implemented by components of the system of FIG. 1.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, embodiments provide a system and method for implementing transparent augmented reality, in which augmented reality content is displayed on a transparent screen so as to overlay a real object behind the screen, including a security interlock which disables one or more data-gathering peripheral when physically directed outside of pre-established limits on the field of view. The augmented reality content may include substantially any useful information, such as virtual objects, graphs, text, instructions, measurements, mathematical or chemical formula, and/or readouts.

Embodiments advantageously combine multiple features into a single solution in the form of a secure transparent desktop display for mounting to a workbench. Further, embodiments advantageously protect confidential or otherwise sensitive or restricted information by providing a security interlock which prohibits the gathering of data regarding real objects outside of pre-established limits on the field of view (e.g., on an adjacent workbench).

Referring particularly to FIGS. 1-6, an embodiment is shown of a system 20 for implementing transparent augmented reality in which content is displayed on a transparent screen so as to overlay a real object behind the screen, including a security interlock which disables one or more data-gathering peripherals when physically directed outside of pre-established limits on the field of view. The system 20 may broadly include a computing device 22, a housing 24, a transparent display 26, one or more peripheral devices including a head tracker 28 and one or more light sources 30, one or more data-gathering peripheral devices including one or more sensors 32 and one or more cameras 34, an articulating arm 36, and a security interlock 38.

The computing device 22 may be communicatively coupled with other components of the system 20 and configured to receive input from at least the data-gathering peripherals 32,34 and provide output to at least the transparent display 26. The input from the data-gathering peripherals 32,34 may be used to manage the augmented reality information to be displayed and/or the manner in which it is displayed (e.g., with regard to perspective), and may include measurements (e.g., of distance to) and visual images of the object and its environment within the field of view. The output to the transparent display 26 may include the augmented reality information for display.

Figure 2:
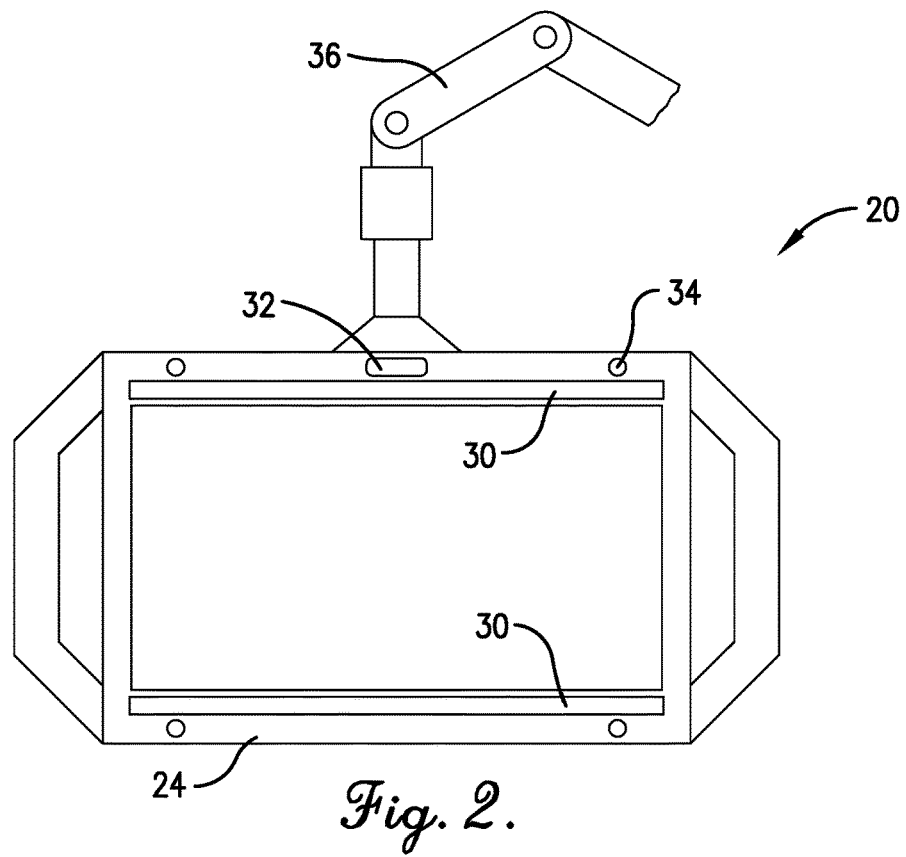
FIG. 2 is an object-side elevation view of the system of FIG. 1.
Figure 3:
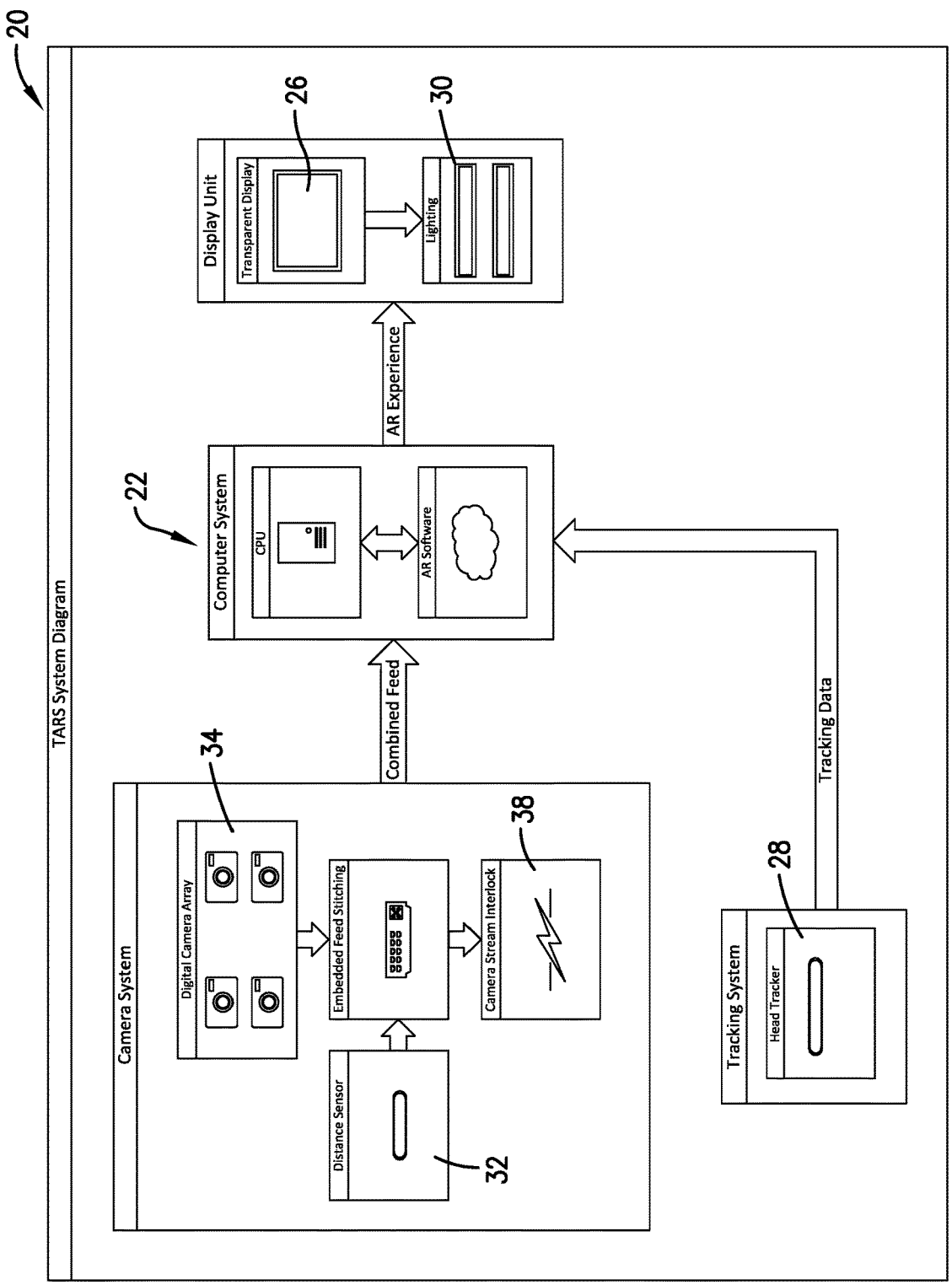
FIG. 3 is a high-level block diagram of components of the system of FIG. 1.

The housing 24 may surround, contain, incorporate, or otherwise physical support other components of the system 10, and may include a first side, seen in FIG. 1, facing the user, and a second side, seen in FIG. 2, facing the real object. In one implementation, the housing 24 may be constructed using a three-dimensional printing technology.

The transparent display 26 may be configured to display augmented reality information for the real object within the field of view, such that the augmented reality information and the real object are simultaneously viewable by the user. The transparent display 26 may be supported on the housing 24, and may be configured to present augmented reality information which appears to the user to be overlaid on the environment, including the real object, on the opposite side of the transparent display 26. In one implementation, the transparent display 26 may include a see-through panel similar in size to standard computer monitors, and may include touch-control features for receiving control inputs from the user of the system 20.

The one or more peripheral devices 28,30 may include devices that do not gather data of the real object or its environment, but which may (e.g., the head tracker 28) or may not (e.g., the light sources 30) gather other data. This data may be provided to the computer 22 to manage the augmented reality information to be displayed and/or the manner in which it is displayed (e.g., with regard to perspective). The head tracker 28 may be configured to determine an orientation of a head of the user. The head tracker 28 may be positioned on the first side of the housing 24, and may be configured to determine the orientation of a head of the user of the system 20. In one implementation, the head tracker 28 may include one or more infrared (IR) sensors. The one or more light sources 30 may be configured to illuminate the real object and its environment within the field of view. The one or more light sources 30 may be positioned on the second side of the housing 24, and may be configured to illuminate the real object. In one implementation, the light sources 30 may include light emitting diode (LED) barlights.

The one or more data-gathering peripheral devices 32,34 may be configured to gather data of the real object and its environment within the field of view. This data may be provided to the computer 22 to manage the augmented reality information to be displayed and/or the manner in which it is displayed. The one or more sensors 32 may include substantially any device for sensing useful information about the real object. The one or more sensors 32 may include a distance sensor positioned on the second side of the housing 24, and configured to measure the distance between itself and the real object. Other sensors may include, for example, temperature, ultraviolet, infrared, and motion sensors. The one or more cameras 34 may be configured to gather visual data for tracking the real object. The one or more cameras 34 may be positioned on the second side of the housing 24, and may be configured to provide visual data for tracking the real object. In one implementation, the camera 34 may include a red-green-blue (RGB) camera.

The articulating arm 36 may be configured to moveably support and facilitate repositioning the transparent display 26 and redirecting the one or more data-gathering peripherals 32,34 in a particular direction. In various implementations, the articulating arm 36 may be configured to slidingly and/or rotatably reposition the transparent display 26 horizontally and/or vertically. The articulating arm 36 may moveably support the housing 24 and other components of the system 20, and through such movement direct the peripherals in a particular direction. In particular, the articulating arm 36 may allow a user to physically reposition the transparent display 26 with regarding to viewing the real object, and the peripherals 32,34 are correspondingly repositioned and redirected. In one application, the articulating arm 36 may be mounted on a bench for secure benchtop operations.

The security interlock 38 may be configured to disable the data-gathering peripherals 32,34 when the articulating arm 38 is moved beyond a pre-established threshold, thereby preventing the data-gathering peripherals 32,34 from gathering data of a real environment outside of a limit of the field of view as determined by the pre-established threshold. The security interlock 38 may be configured to shut down some or all of the data-gathering peripherals 32,34, such as the one or more sensors 32 and the one or more camera 34, when the articulating arm 36 is turned, oriented, positioned, or otherwise moved so that the data-gathering peripherals 32,34 are physically directed outside of pre-established limits on the field of view.

More particularly, the user may be allowed to reposition the transparent display 26 to better view the AR information and/or the real object of interest. As discussed, such movement correspondingly redirects the peripherals 32,34 as well. The security interlock 38 limits the user's ability to reposition the transparent display 26 such that the data-gathering peripherals 32,34 are partially or wholly directed toward another real object or environment (e.g., an adjacent benchtop or other work area) for which it is desirable or necessary to prevent the gathering of data. Thus, the user may be allowed to reposition the transparent display 26 and correspondingly redirect the data-gathering peripherals 32,34 within pre-established limits of a field-of-view. However, when the user attempts to reposition the transparent display 26 such that the data-gathering peripherals 32,34 are directed outside of these pre-established limits, the data-gathering peripherals 32,34 may be are disabled (e.g., powered down or shut off) to prevent the gathering of data.

Figure 5:
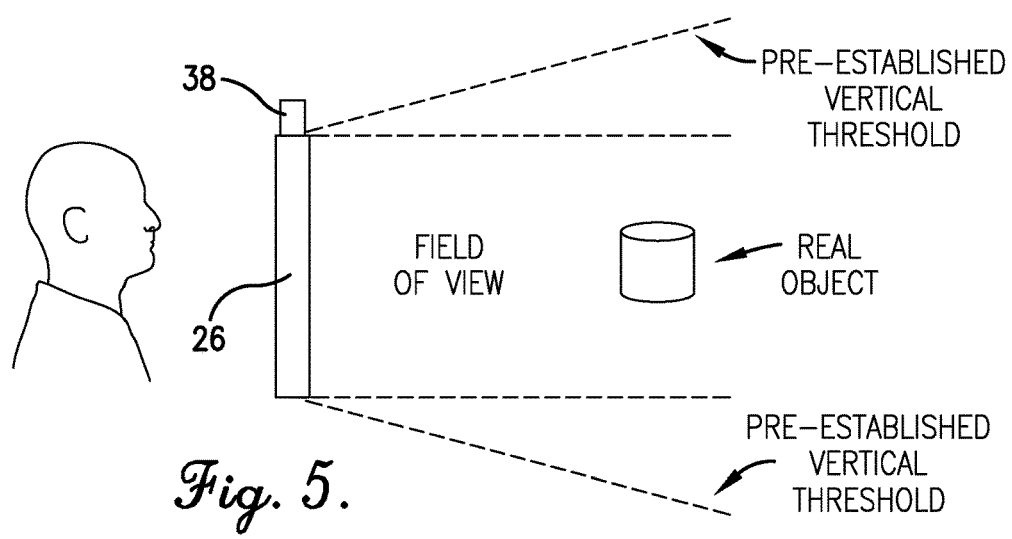
FIG. 5 is a side elevation view of the system of FIG. 1 showing vertical pre-established thresholds limiting the field of view of the data-gathering peripheral components.

Referring particularly to FIG. 6, in one implementation, the security interlock 38 may include one or more contact switches 40 which define the pre-established threshold in at least one direction, wherein a position of each contact switch 40 may be adjustable to change a location of the pre-established threshold in the at least one direction. For example, the security interlock 38 may include first and second contact switches 40 which define first and second pre-established thresholds on a horizontal axis (as shown in FIG. 4), and third and fourth contact switches 40 which define third and fourth pre-established thresholds on a vertical axis (as shown in FIG. 5). Each contact switch 40 may be activated when the articulating arm 36 is moved in such a manner that the data-gathering peripherals 32,34 are directed beyond the respective pre-established threshold. In other implementations, the security interlock may include one or more encoders, accelerometers, or similar devices which provide position data based on movement of the articulating arm to the computer 22 which determines, based on the position data, that the data-gathering peripherals 32,34 are directed outside of the pre-established limits.

In operation, the system 20 may provide three or more outputs including a tracking feed from the head tracker 28, a stitched camera feed based on the one or more cameras 34, and a distance from the real object. The camera feed may provide visual data for augmented reality tracking of objects. Once the user is tracked, digital data can be visualized on the transparent display 26, which may, in turn, be locked onto the real object seen through the transparent display 26. The system 20 allows for a wide field of view and the ability of the user to view the digital content at various angles while maintaining positional tracking of the real object and displayed data.

Other embodiments and implementations of the system 20 may include more, fewer, or alternative components and/or perform more, fewer, or alternative actions, including those discussed elsewhere herein, and particularly those discussed in the following section describing the method 120.

Referring to FIG. 7, an embodiment of a method 120 is shown for implementing transparent augmented reality. The method may include the following steps. In one implementation, the method 120 may reflect operation of and be implemented by components of the system 20 of FIGS. 1-6.

Augmented reality information for a real object within a field of view may be displayed on a transparent display 26, such that the augmented reality information and the real object are simultaneously viewable by a user, as shown in step 122. The augmenting information may include, for example, a virtual object, a graph, a text, and/or an image. In one implementation, the transparent display 26 may include a transparent panel including a touch screen input device configured to facilitate the user entering an input by touching a surface of the transparent panel.

Peripheral devices may be employed, as shown in step 124. This may include determining with a head tracker 28 an orientation of a head of the user, as shown in step 126, and illuminating with one or more light sources 30 the field of view, as shown in step 128. In one implementation, the head tracker 28 may include one or more infrared sensors. In one implementation, the one or more light sources 30 may include a light emitting diode barlight.

Data of the field of view may be gathered with one or more data-gathering peripheral devices, as shown in step 130. This may include measuring with a distance sensor 32 a distance between the distance sensor and the real object, as shown in step 132, and gathering with one or more cameras 34 visual data for tracking the real object, as shown in step 134. In one implementation, the one or more cameras 34 may include a red-green-blue camera.

The transparent display 26 may be moveably supported and repositionable and the one or more data-gathering peripherals 32,34 may be moveably supported and redirectable in a particular direction with an articulating arm 36, as shown in step 136.

The data-gathering peripherals 32,34 may be disabled with a security interlock 38 when the articulating arm 36 is moved beyond a pre-established threshold, thereby preventing the data-gathering peripherals 32,34 from gathering data of a real environment outside of a limit of the field of view as determined by the pre-established threshold, as shown in step 138. In one implementation, the security interlock 38 may disable the one or more data-gathering peripherals 32,34 by disconnecting power to the one or more data-gathering peripherals 32,34.

In one implementation, the security interlock 38 may include one or more contact switches 40 which define the pre-established threshold in at least one direction, wherein a position of each contact switch 40 may be adjustable to change a location of the pre-established threshold in the at least one direction. For example, the security interlock 38 may include first and second contact switches 40 which define first and second pre-established thresholds on a horizontal axis (as shown in FIG. 4), and third and fourth contact switches 40 which define third and fourth pre-established thresholds on a vertical axis (as shown in FIG. 5).

Other embodiments and implementations of the method 120 may include more, fewer, or alternative steps and/or involve more, fewer, or alternative components, including those discussed elsewhere herein and particularly those discussed in the preceding section describing the system 20.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

The invention claimed is:

1. A system for implementing transparent augmented reality, the system comprising:
    a transparent display configured to display augmented reality information for a real object within a field of view, such that the augmented reality information and the real object are simultaneously viewable by a user;
    one or more peripheral devices including—
        a head tracker configured to determine an orientation of a head of the user, and
        one or more light sources configured to illuminate the field of view;
    one or more data-gathering peripheral devices configured to gather data of the field of view including—
        a distance sensor configured to measure a distance between the distance sensor and the real object, and
        one or more cameras configured to gather visual data for tracking the real object;
    an articulating arm configured to moveably support and facilitate repositioning the transparent display and redirecting the one or more data-gathering peripherals in a particular direction; and
    a security interlock configured to disable the data-gathering peripherals when the articulating arm is moved beyond a pre-established threshold, thereby preventing the data-gathering peripherals from gathering data of a real environment outside of a limit of the field of view as determined by the pre-established threshold.

2. The system of claim 1, wherein the head tracker includes one or more infrared sensors.

3. The system of claim 1, wherein the one or more cameras include a red-green-blue camera.

4. The system of claim 1, wherein the one or more light sources include a light emitting diode barlight.

5. The system of claim 1, wherein the transparent display includes a transparent panel including a touch screen input device configured to facilitate the user entering an input by touching a surface of the transparent panel.

6. The system of claim 1, wherein the augmented reality information is selected from the group consisting of: a virtual object, a graph, a text, and an image.

7. The system of claim 1, wherein the security interlock disables the one or more data-gathering peripherals by disconnecting power to the one or more data-gathering peripherals.

8. The system of claim 1, wherein the security interlock includes a contact switch which defines the pre-established threshold in at least one direction, wherein a position of the contact switch is adjustable to change a location of the pre-established threshold in the at least one direction.

9. The system of claim 1, wherein the security interlock includes first and second contact switches which define first and second pre-established thresholds on a horizontal axis, and third and fourth contact switches which define third and fourth pre-established thresholds on a vertical axis.

10. A system for implementing transparent augmented reality, the system comprising:
    a transparent display configured to display augmented reality information for a real object within a field of view, such that the augmented reality information and the real object are simultaneously viewable by a user, wherein the transparent display includes a transparent panel including a touch screen input device configured to facilitate the user entering an input by touching a surface of the transparent panel;
    one or more peripheral devices including—
        a head tracker configured to determine an orientation of a head of the user, and
        one or more light sources configured to illuminate the field of view;
    one or more data-gathering peripheral devices configured to gather data of the field of view including—
        a distance sensor configured to measure a distance between the distance sensor and the real object, and
        one or more cameras configured to gather visual data for tracking the real object;
    an articulating arm configured to moveably support and facilitate repositioning the transparent display and redirecting the one or more data-gathering peripherals in a particular direction; and
    a security interlock configured to disable the data-gathering peripherals when the articulating arm is moved beyond a pre-established threshold, thereby preventing the data-gathering peripherals from gathering data of a real environment outside of a limit of the field of view as determined by the pre-established threshold, wherein the security interlock includes—
        a first adjustable contact switch which adjustably defines a first pre-established threshold on a horizontal axis, and a second adjustable contact switch which adjustably defines a second pre-established threshold on the horizontal axis.

11. The system of claim 1, wherein the security interlock further includes—
a third first adjustable contact switch which adjustably defines a third pre-established threshold on a vertical axis; and
a fourth adjustable contact switch which adjustably defines a fourth pre-established threshold on the vertical axis.

12. A method for implementing transparent augmented reality, the method comprising:
displaying on a transparent display augmented reality information for a real object within a field of view, such that the augmented reality information and the real object are simultaneously viewable by a user;
employing one or more peripheral devices including—
determining with a head tracker an orientation of a head of the user, and
illuminating with one or more light sources the field of view;
gathering with one or more data-gathering peripheral devices data of the field of view including—
measuring with a distance sensor a distance between the distance sensor and the real object, and
gathering with one or more cameras visual data for tracking the real object;
moveably supporting and facilitating with an articulating arm repositioning the transparent display and redirecting the one or more data-gathering peripherals in a particular direction; and
disabling the data-gathering peripherals with a security interlock when the articulating arm is moved beyond a pre-established threshold, thereby preventing the data-gathering peripherals from gathering data of a real environment outside of a limit of the field of view as determined by the pre-established threshold.

13. The method of claim 12, wherein the head tracker includes one or more infrared sensors.

14. The method of claim 12, wherein the one or more cameras include a red-green-blue camera.

15. The method of claim 12, wherein the one or more light sources include a light emitting diode barlight.

16. The method of claim 12, wherein the transparent display includes a transparent panel including a touch screen input device configured to facilitate the user entering an input by touching a surface of the transparent panel.

17. The method of claim 12, wherein the augmented reality information is selected from the group consisting of: a virtual object, a graph, a text, and an image.

18. The method of claim 12, wherein the security interlock disables the one or more data-gathering peripherals by disconnecting power to the one or more data-gathering peripherals.

19. The method of claim 12, wherein the security interlock includes a contact switch which defines the pre-established threshold in at least one direction, wherein a position of the contact switch is adjustable to change a location of the pre-established threshold in the at least one direction.

20. The method claim 12, wherein the security interlock includes first and second contact switches which define first and second pre-established thresholds on a horizontal axis, and third and fourth contact switches which define third and fourth pre-established thresholds on a vertical axis.

* * * * *